United States Patent [19]

Gross

[11] Patent Number: 4,624,359

[45] Date of Patent: Nov. 25, 1986

[54] FLEXIBLE DRIVE SYSTEM

[75] Inventor: Jack R. Gross, Waynesville, Ohio

[73] Assignee: NCR Corporation, Dayton, Ohio

[21] Appl. No.: 684,418

[22] Filed: Dec. 20, 1984

[51] Int. Cl.[4] .............................................. B65G 47/46

[52] U.S. Cl. ..................................... 198/366; 198/750; 198/468.2; 198/468.6

[58] Field of Search ............. 198/468.01, 468.2, 468.6, 198/750, 366, 346.2; 194/DIG. 26; 221/268-270

[56] References Cited

U.S. PATENT DOCUMENTS

| | | | |
|---|---|---|---|
| 1,631,892 | 5/1926 | Saoutchik | 49/323 |
| 3,675,386 | 7/1972 | Sels | 53/63 |
| 3,701,577 | 10/1970 | Fischer | 308/3.6 |
| 3,919,554 | 11/1975 | Frank | 198/346.2 |
| 4,017,004 | 4/1977 | Onoe et al. | 194/DIG. 26 |
| 4,270,652 | 6/1981 | Lay et al. | 198/468.2 |
| 4,342,325 | 8/1982 | Lundblad | 194/DIG. 26 |
| 4,343,392 | 8/1982 | Ellis et al. | 98/468.6 |
| 4,363,584 | 12/1982 | Kokubo | 194/DIG. 26 |

OTHER PUBLICATIONS

Advertisement by duPont for DYMETROL elastomeric tapes, dated Aug. 9, 1984, pp. 88-89, in "MACHINE DESIGN".

*Primary Examiner*—Joseph E. Valenza
*Assistant Examiner*—Kyle E. Shane
*Attorney, Agent, or Firm*—Wilbert Hawk, Jr.; Albert L. Sessler, Jr.

[57] ABSTRACT

A drive system utilizing a plurality of flexible drive elements disposed in aligned guideways is provided. Devices such as currency carriers may be attached to the flexible drive elements for movement between currency receiving position, currency presenting position, and currency purge position. A mechanism operated cam assciated with the guideways operatively cooperates with a cam follower mechanism on the carriage to cause currency gripping and aligning devices in the carriage to operate at predetermined points as the flexible drive elements traverse the guideways.

24 Claims, 16 Drawing Figures

FLEXIBLE DRIVE SYSTEM

BACKGROUND OF THE INVENTION

Article transport systems used in various types of equipment are frequently required to occupy a minimum amount of space while performing the transport function in a reliable and efficient manner. In automated teller machines (ATMs), for example, it may be required to transport packs of currency from a secure storage position to a "presenting" position in which the currency is made available to a customer who is operating the machine. Since ATMs are complex devices, designed to be as compact as possible, which may be placed in locations remote from constant scrutiny by employees, it is important that all mechanisms associated therewith be designed to be compact, reliable and efficient. Also, it may be desired to operate such transport systems to transport articles such as currency from one device module or unit to another. It is therefore highly desirable to provide a transport system which is capable of transporting such articles from one module or unit to another without the need for separate feed or drive mechanisms in each of the modules.

SUMMARY OF THE INVENTION

The present invention relates to a flexible drive system, and more particularly relates to a system employing flexible tape driving means for transporting articles such as currency from one location to another.

In accordance with one embodiment, a drive system comprises frame means; track means mounted on said frame means; strip means adapted to be respectively movable in either of two directions along said track means, said strip means having first and second portions; utilizing means coupled to said first portions of said strip means, including gripper means for gripping currency fed to said utilizing means, cam follower means for moving said gripper means into and out of currency gripping position as said utilizing means is moved along said track means, and retaining means for retaining said currency in position within said utilizing means; means coupled to said second portions of said strip means for selectively moving said strip means to move said utilizing means to any one of a plurality of different positions along said track means; a first mechanism operator on said frame means including cam means which is engageable with said cam follower means in said utilizing means in at least one of the plurality of different positions along said track means to cause said gripper means to move into and out of currency gripping position as said utilizing means is moved along said track means; and a second mechanism operator on said frame means operative to move said retaining means into and out of retaining position as said utilizing means is moved along said track means.

It is accordingly an object of the present invention to provide an effective, efficient drive system.

A further object is to provide a drive means employing a plurality of flexible elements located within corresponding guideways to perform a transporting function.

A further object is to provide a flexible drive system for transmission of power through limited spaces.

A further object is to provide a flexible drive system for the transportation of articles from one unit to another.

With these and other objects, which will become apparent from the following description, in view, the invention includes certain novel features of construction and combinations of parts, a plurality of forms or embodiments of which are hereinafter described with reference to the drawings which accompany and form a part of this specification.

BRIEF DESCRIPTION OF THE DRAWINGS

FIG. 7 is a view similar to FIG. 6, in which the carriage has been moved by the drive mechanism from "home" position toward a "present" position in which currency carried by the carriage is presented to a customer or otherwise disposed of.

DETAILED DESCRIPTION

The flexible drive mechanism of the present invention may be employed in various types of business and other machines for use in transmitting power and in moving various types of sub-assemblies within the machines. Furthermore, the movement of these sub-assemblies along a predetermined path can cause secondary functions to occur relative to the sub-assembly position or direction of travel. In the embodiment described herein, the flexible drive mechanism is shown as driving a carriage for holding currency from one position to another within a automated teller machine.

Figure 1:
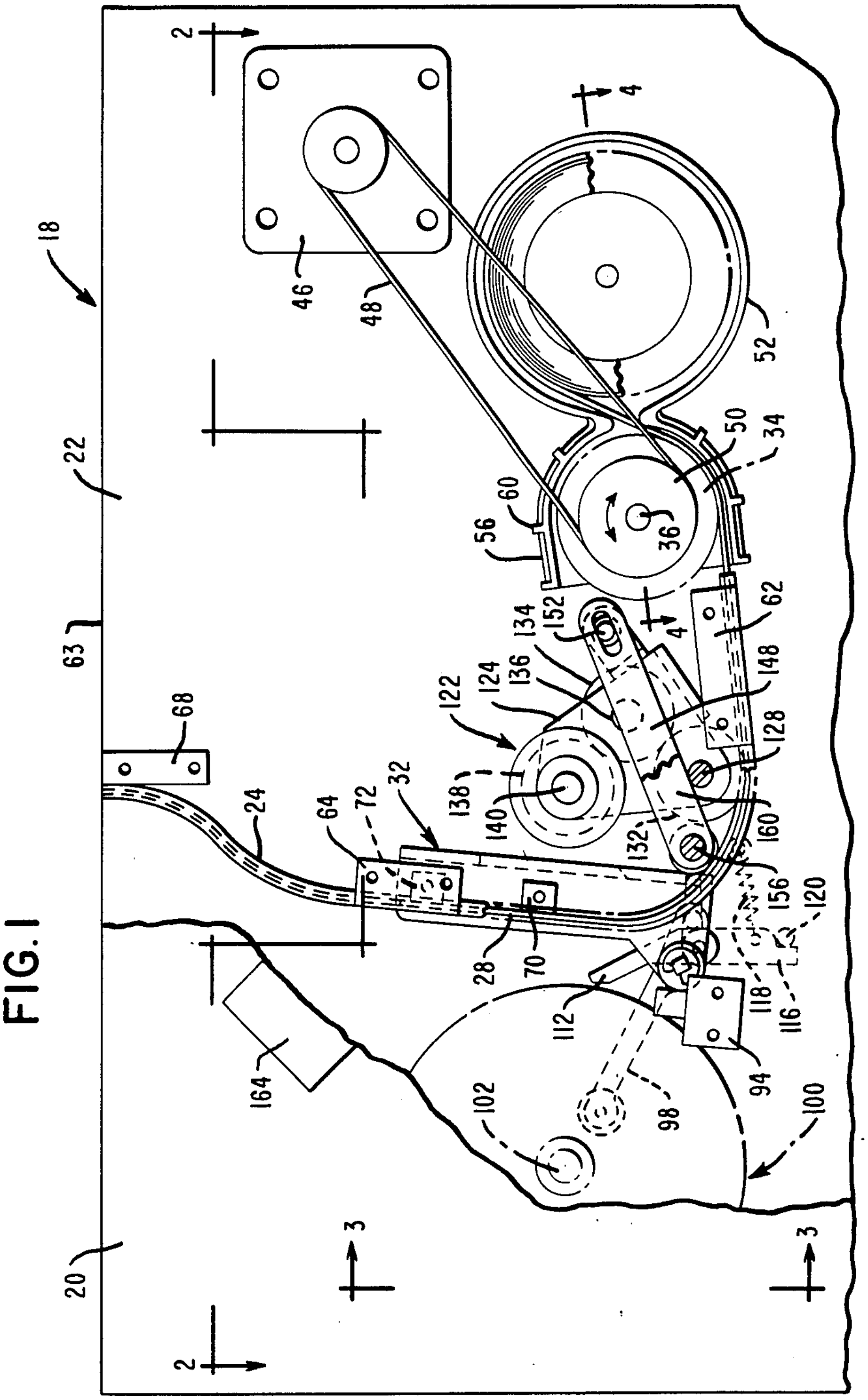
FIG. 1 is a side elevation view, partly broken away, of one embodiment of the flexible drive system of the present invention.
Figure 2A:
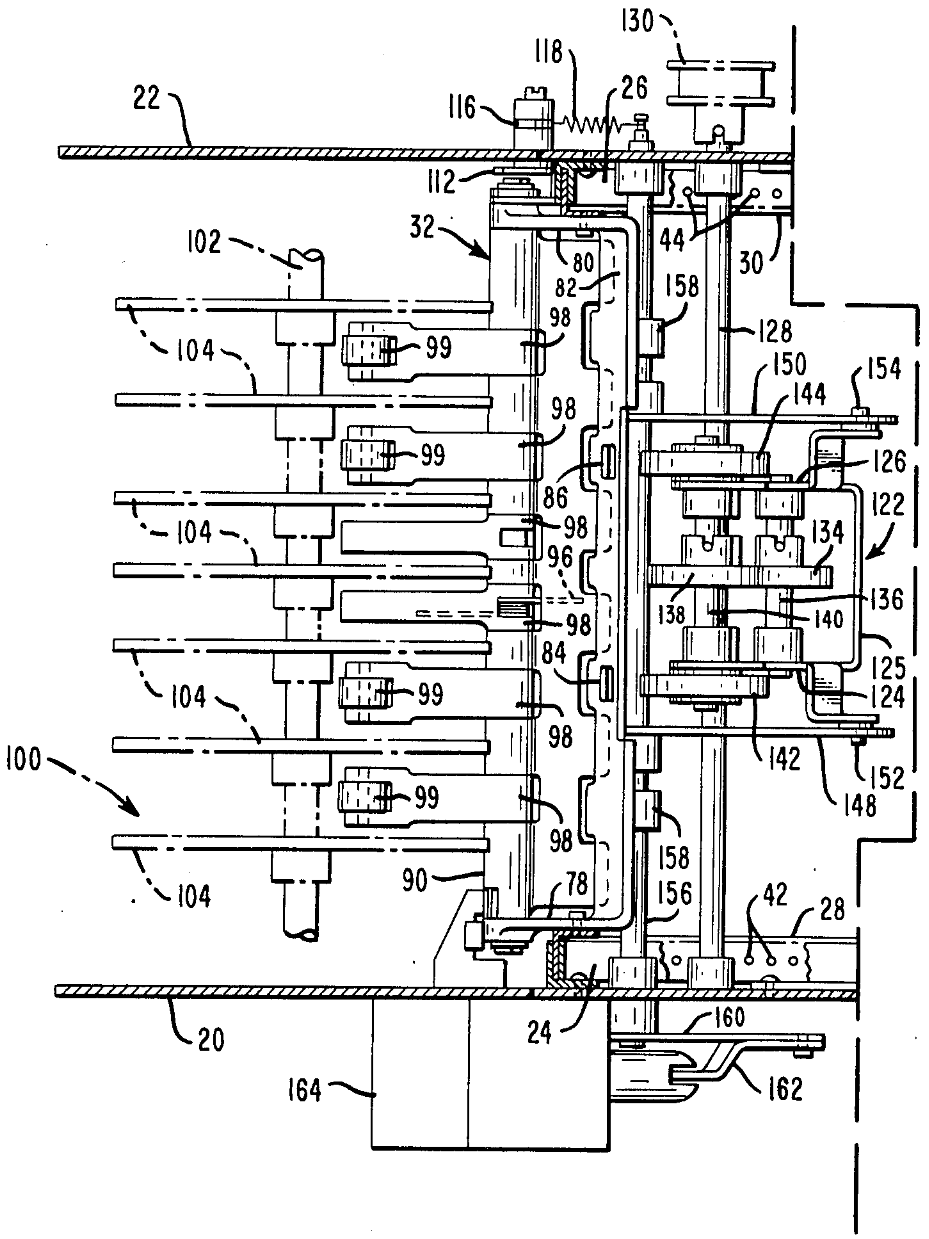
FIGS. 2A and 2B, taken together, constitute a sectional view taken on line 2—2 of FIG. 1.
Figure 2B:
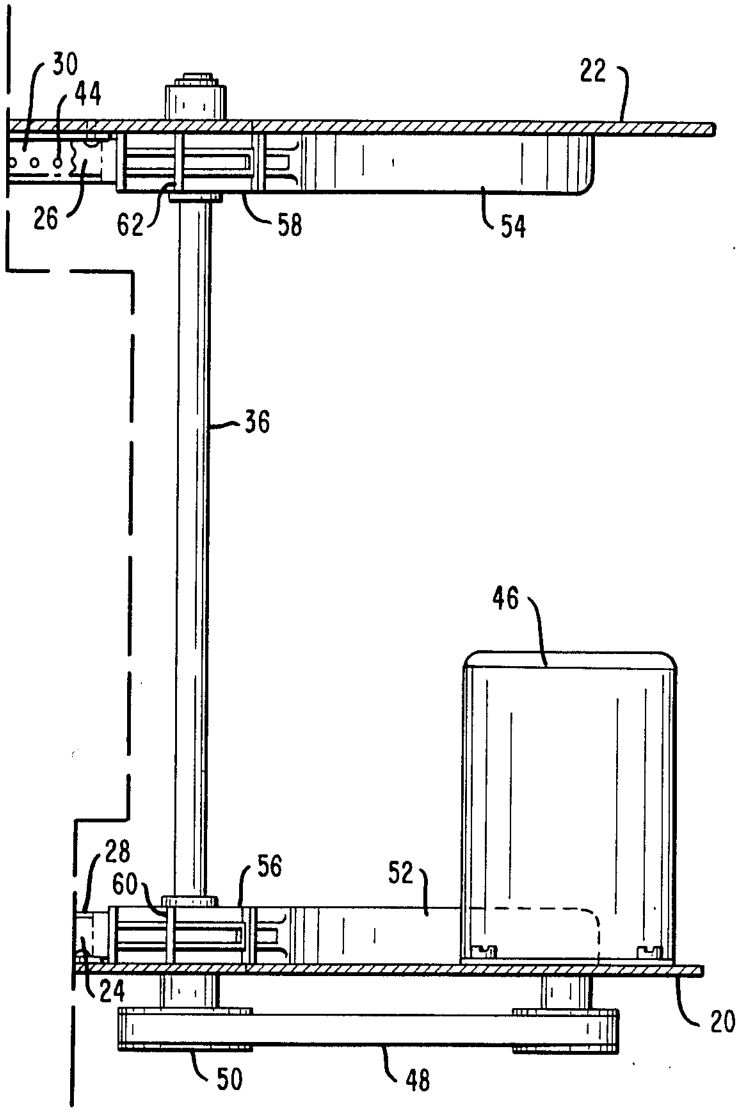
Figure 3:
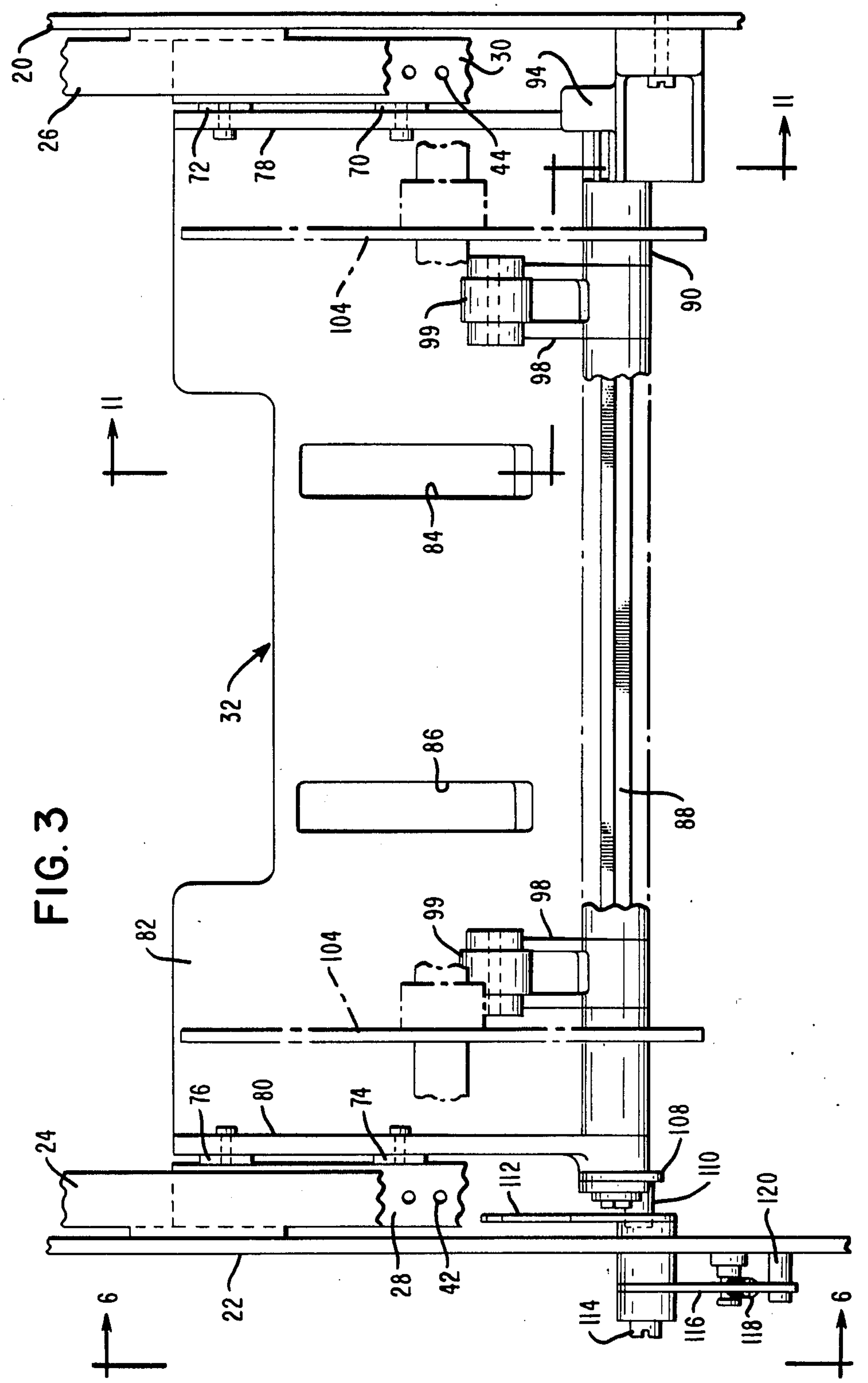
FIG. 3 is a sectional view, taken along lines 3—3 of FIG. 1.
Figure 4:
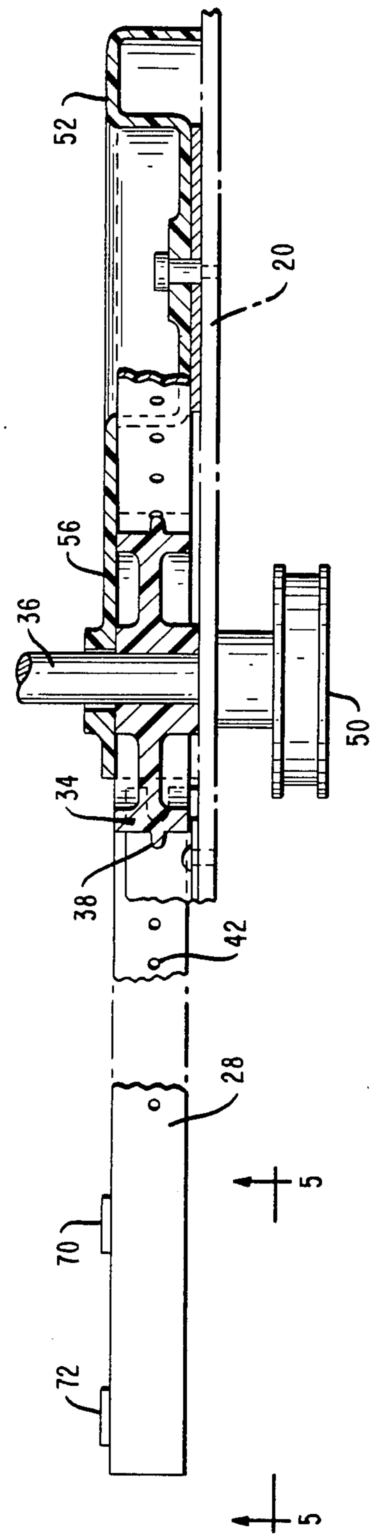
FIG. 4 is a sectional view, on an enlarged scale, taken along line 4—4 of FIG. 1, showing one of the storage spools and driving sprocket wheels for the flexible driving tape.
Figure 5:
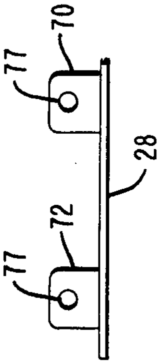
FIG. 5 is a sectional view taken along line 5—5 of FIG. 4, showing the tabs which are integral with the driving tape and which are used to secure the carriage thereto.

Referring now to the drawing, and particularly to FIGS. 1-3 inclusive, the flexible drive mechanism is contained in a unit 18; is mounted on side frames 20 and 22, and includes first and second slotted tracks 26 and 24 which are fixed to said frames 20 and 22, respectively. A pair of flexible strips or tapes 28 and 30 move within the tracks 24 and 26, respectively, and transmit the desired driving motion to that part of the mechanism, such as a carriage 32, which is to be driven. The tapes 28 and 30 may be of any suitable material, such as metal or plastic, which provides the desired characteristics of strength, sufficient rigidity to prevent buckling, flexibility to extend through the curved portions of the track, and a low coefficient of friction. One suitable material is "DYMETROL" tape, a highly oriented elastomeric copolyester tape manufactured by the DuPont Company, Wilmington, Delaware.

First and second sprocket wheels 34 are fixed to a shaft 36, journaled to the side frames 20 and 22, and are provided with projections 38 around the periphery thereof, which cooperate with appropriately spaced apertures 42 and 44 in the tapes 28, 30 to cause said tapes to be driven in either of two opposite directions. The sprocket wheels 34 are driven by a motor 46 acting through a belt 48 and a pulley 50 fixed to the shaft 36.

Tape storage spools 52, 54 hold the free end portions of the tapes 28, 30 not engaged with the sprocket wheels 34 and the tracks 24, 26. The inner shapes of these spools cause the tapes to be collected in a spiral configuration as the tapes are withdrawn from the tracks 24, 26.

Formed integrally with each of the spools 52, 54 are guides 56, 58 which hold the tapes 28, 30 in engagement with the sprocket wheels 34 and guide the tapes between the spools 52, 54 and the tracks 24, 26. It will be noted that the shape of each spool 52 or 54 with its associated guide 56 or 58 is that of a truncated figure eight. The guides 56, 58 are externally ribbed, as at 60, 62, for added strength.

As may be seen most readily in FIG. 1, the tracks 24 and 26 extend from the guides 56, 58 generally horizontally to the left, then curve to a generally vertical orientation, and finally follow a gentle "s" configuration to the upper surfaces 63 of the frames 20, 22. Additional tracks on complementary modules may be located in alignment with the ends of the tracks 24, 26 to permit further movement of the tapes 28, 30 and the carriage 32 or other mechanism carried thereby, as will subsequently be described. The tracks 24, 26 may be held in position on the side frames 20, 22 by suitable means such as brackets 62, 64 and 68. At the end of each tape 28, 30 are a pair of tabs 70, 72 and 74, 76 extending perpendicular to the tape and provided with apertures 77 to enable the carriage 32 to be secured to the tapes 28 and 30.

The carriage 32 includes a pair of sideplates 78, 80 and a backplate 82 integral therewith, which is apertured at 84 and 86 to receive a pair of drive rollers, as will subsequently be described. The tabs 70, 72 are secured to the side plate 78, and the tabs 74, 76 are secured to the side plate 80. A square shaft 88 is journaled in the side plates 78, 80 and extends therebetween.

An aligner plate 90 (FIGS. 2A, 11 and 12) is mounted on the shaft 88 and is rotatable with respect thereto. The plate 90 serves as a shiftable floor to retain currency 91 within the carriage 32 at times during operation of the automated teller machine or other device with which said carriage is associated, and to permit removal of the currency 91 therefrom at other times for "purge" purposes. A toothed segment 92 (FIG. 12) is integral with the plate 90 at one end thereof and, in the "purge" position of the carriage 32, cooperates with a "purge" gear segment 94 mounted on the side frame 20, to cause the aligner plate 90 to be moved to its open position against the force of a spring 96 (FIG. 2A) to permit currency to be purged from the carriage 32, as will subsequently be described. When the carriage 32 is moved out of the "purge" position, the plate 90 is permitted to return to its closed position under the urging of the spring 96.

Also mounted on the square shaft 88, and fixed to rotate therewith, are a plurality of stripper fingers 98 having rollers 99 thereon, which cooperate with a stacker wheel 100 mounted on a shaft 102 journaled in the machine framework. As is well-known in typical automated teller machine construction, the stacker wheel 100 functions to take currency from a stack, a cassette, or other station and to dispose the currency 91 in a stack for further disposition. See, for example, U.S. Pat. No. 3,675,386. In this instance, the latter stack is in the carriage 32.

Figure 6:
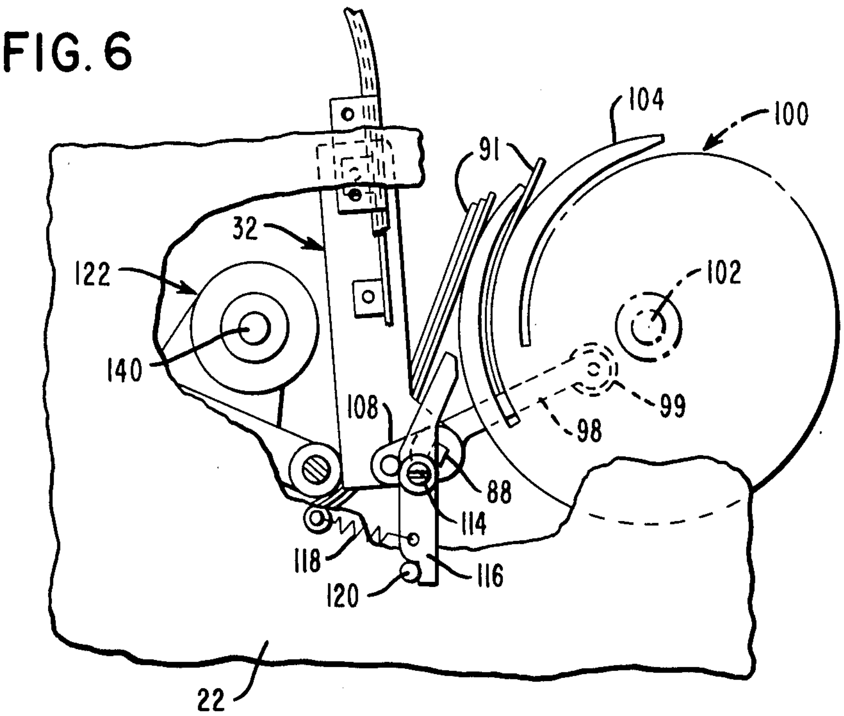
FIG. 6 is a fragmentary sectional view, partly broken away, taken along line 6—6 of FIG. 3, showing the flexible drive mechanism, the track in which it operates, and in "home" position, a currency carrying carriage mounted on the flexible drive mechanism.

The stripper fingers 98 are positioned between spiral tine disks 104 of the stacker wheel 100, and function to strip bills such as the bills 91 carried by the wheel 100, and cause them to be deposited in the carriage 32 (FIG. 6). The fingers 98 move between a first stripping position and a second position in which they clamp the bills 91 in the carriage 32 and toward which they are urged by the spring 96.

Movement of the fingers 98 is controlled by a cam arm 108 fixed to the square shaft 88 and having a cam follower stud 110 fixed to the end thereof. The stud 110 cooperates with the peripheral surface of a cam lever 112 located adjacent the inside surface of the side frame 22 and fixed to a short shaft 114 journaled in and extending through said side frame. A stop arm 116 is fixed to the shaft 114 on the outside of the frame 22 and is urged by a spring 118 against a stop 120, connected to said arm and to the frame 22.

Figure 12:
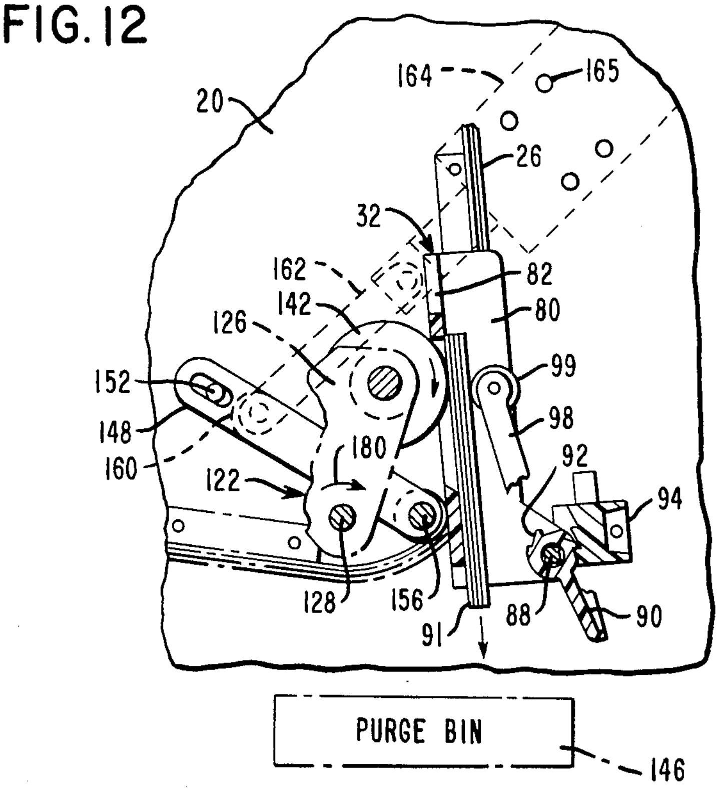
FIG. 12 is a view similar to FIG. 11, showing the carriage in "purge" position, with the currency aligner in open position.

Disposed between the side frames 20 and 22 is a purge drive assembly 122. As best shown in FIG. 2A, the assembly 122 includes two frame members 124 and 126 integral with a base 125 and pivotally mounted on a shaft 128 journaled in the machine side frames 20 and 22. The shaft 128 is driven by a motor 129 (FIG. 14) through a pulley 130 fixed to said shaft. Also fixed to the shaft 128 is a gear 132 (FIG. 1) which coacts with a pinion 134 mounted on a shaft 136 journaled in the frame members 124 and 126. The pinion in turn drives a further gear 138 fixed to a shaft 140, to which are also fixed two drive rollers 142 and 144. These drive rollers, when the assembly 122 is in operative position, extend through the apertures 84 and 86 in the back plate 82 of the carriage 32 to drive currency 91 contained therein from said carriage into a purge bin 146 (FIG. 12).

Arms 148 and 150 are slotted at one end and are loosely connected by studs 152 and 154 to the frame members 124 and 126. At their other ends, the arms 148 and 150 are fixed on a shaft 156 journaled in the side frames 20 and 22. Guide rollers 158 are disposed on the shaft 156 to provide stability to the lower portion of carriage 32. Also fixed on the shaft 156 is an arm 160 which is connected through a second arm 162 to a solenoid 164 fixed to the side frame 20 by suitable means such as screws extending through apertures 165 in said frame. When actuated, the solenoid 164 rocks the arm 160, the shaft 156, and the arms 148 and 150. This causes the purge drive assembly 122 to rock about its shaft 128 to position the drive rollers 142, 144 through the apertures 84, 86 in the plate 82 to drive currency 91 contained in the carriage 32 downward into the purge bin 146. The aligner plate 90 is in its open position at this time and thus offers no obstacle to movement of the currency 91.

The operating sequence of the flexible drive system of the present invention will now be described. Operation of the various motors and solenoids of the system is controlled by a controller 168, as represented diagrammatically in FIG. 14. The controller 168 may be embodied in the overall control circuitry of the ATM or other device in which the system of the present invention is used, or may be an independent unit, such as a suitably programmed microprocessor. It will be assumed that at the beginning of the operation, the carriage 32 is at "home" position, as shown in FIGS. 1 and 6. The views of FIGS. 1 and 6 are taken from opposite sides of the mechanism in order to facilitate clear showing of the various machine elements. In this "home" position, currency 91 is being supplied to the carriage 32 by the stacker wheel 100, and the stripper fingers 98 are in a stripping position so that they act to remove currency 91 from the tines of the disks 104 of the stacker wheel 100, the currency 91 accumulating in the carriage 32.

Figure 7:
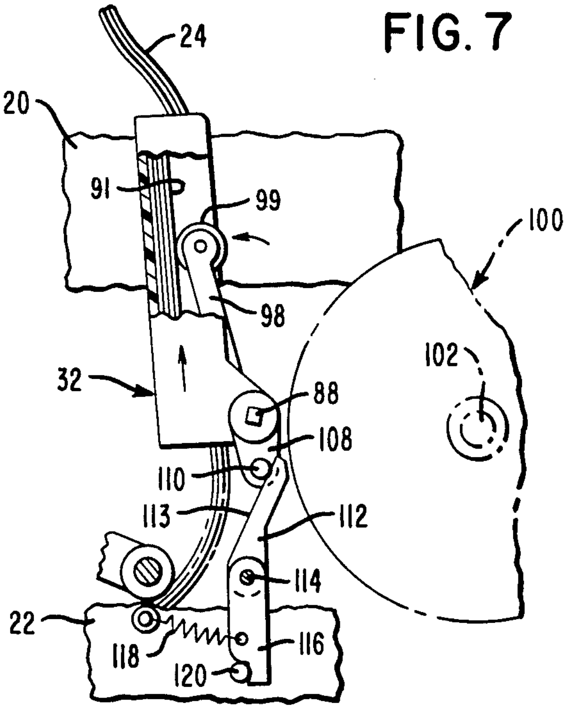

After the desired amount of currency 91 has been collected by the carriage 32, the motor 46 is energized by an appropriate signal from the controller 168, causing said motor to drive the sprocket wheels 34, so as to cause the tapes 28 and 30 to move to the left as viewed in FIG. 1, or to the right as viewed in FIG. 6, thereby shifting the carriage 32 from the position in which it is shown in FIG. 6 to the position in which it is shown in FIG. 7.

In the position of FIG. 7, the cam follower stud 110 engages the left surface of the cam lever 112. As the carriage 32 is moved by the tapes 28, 30 to the position in which it is shown in FIG. 7, the stud 110 rides upward on the angled surface 113 of the lever 112, urged by spring 96. The resulting movement acts through the arm 108 and the square shaft 88 to rock the stripper fingers 98 from the position of FIG. 6 to the position in which they are shown in FIG. 7, in which they grip the currency 91 contained in the carriage 32, and clamp it securely therein.

Figure 8:
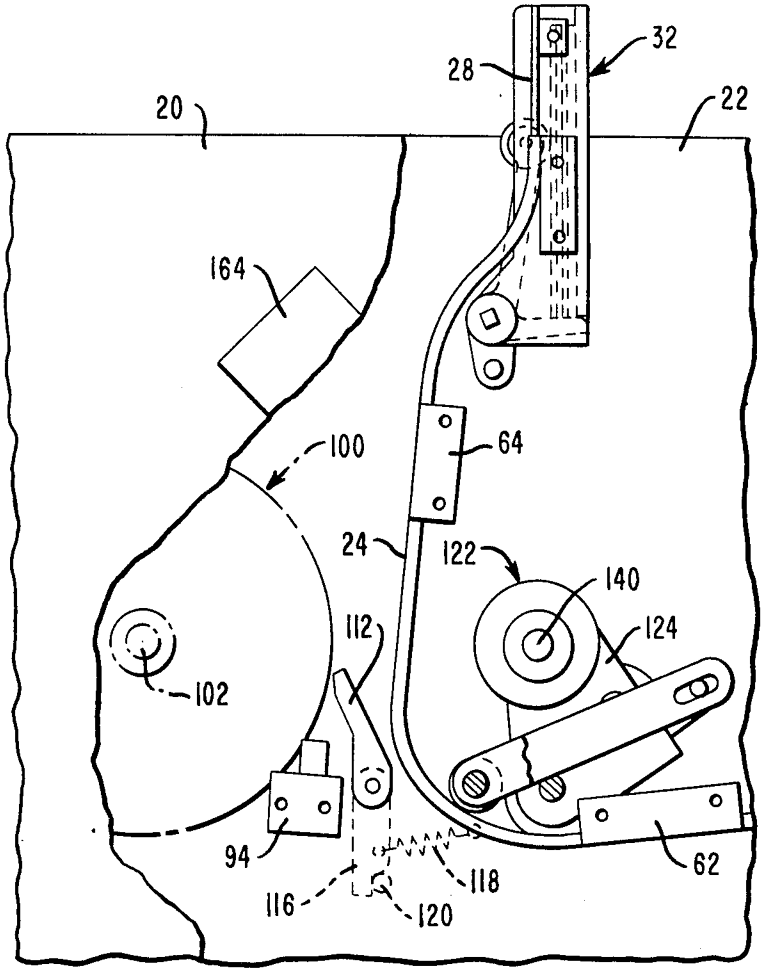
FIG. 8 is a view similar to FIGS. 6 and 7, in which the carriage has reached the "present" position, or is enroute to a destination in a second unit, if used in the embodiment shown in FIG. 15.

The tapes 28 and 30 may then continue to drive the carriage 32 to the "present" position in which it is shown in FIG. 8. In this position, a portion of the currency 91 may extend out from the machine containing the flexible drive system so that said currency is "presented" so that it can be gripped by a customer. Alternatively, as will subsequently be described, a second module or unit may be attached to the side plates 20, 22 with a second pair of tracks registering in position with the tracks 24 and 26, so that the tapes 28, 30 can continue to drive the carriage 32 into and through the second module.

Figure 9:
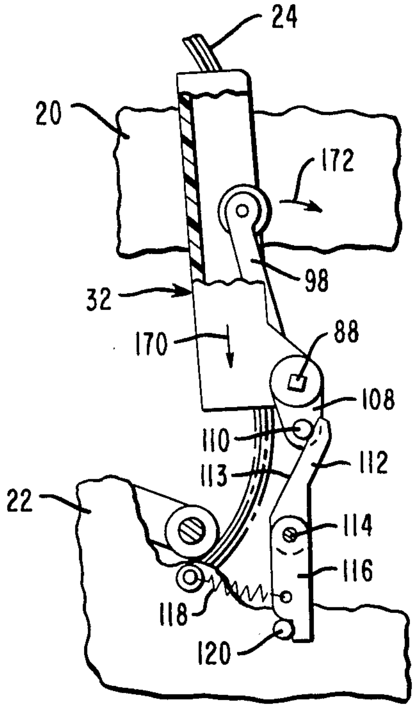
FIG. 9 is a view similar to FIGS. 6, 7 and 8, in which the carriage is returning from the "present" position to the "home" position.

From the "present" position of FIG. 8, the carriage 32 is moved downwardly toward "home" position, as shown in FIG. 9, and as indicated by the arrow 170 therein. As the carriage moves downwardly, the stud 110, in moving along the surface 113 of the cam lever 112, causes the stripper fingers 98 to rock in a clockwise direction, as indicated by the arrow 172.

When the carriage 32 is in the "home" position of FIG. 6, a decision may be made by the controller 168, or by the controlling circuitry of the automated teller machine in which this device is used, that the currency deposited in the carriage 32 should be "purged", rather than moved to the position of FIG. 8. Such a "purge" decision may be made, for example, when detection mechanisms within the automated teller machine determine that an incorrect amount of currency 91 was placed in the carriage 32 by reason of misfeeding. The currency collected in the carriage 32 is then deposited in a suitable receptacle, such as the purge bin 146.

Figure 11:
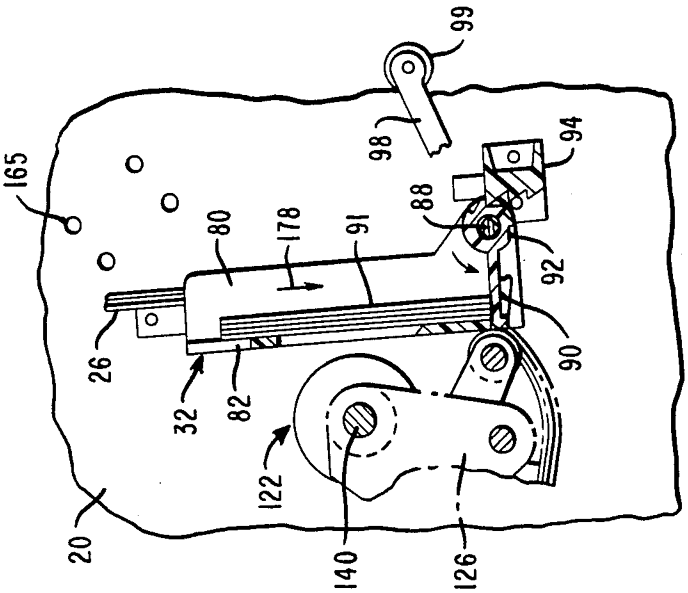
FIG. 11 is fragmentary sectional view taken along line 11—11 of FIG. 3, showing the carriage in the same relative position as in FIG. 10, and also showing details of the mechanism for shifting the currency aligner from closed to open position.
Figure 10:
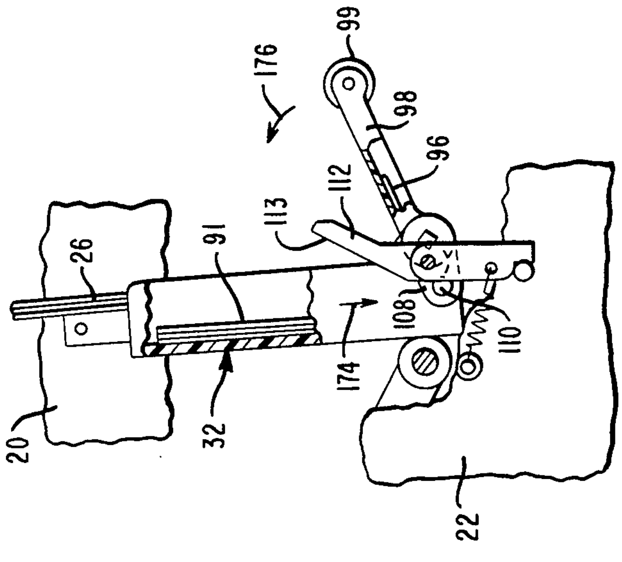
FIG. 10 is a view similar to FIGS. 6–9 inclusive, in which the carriage has moved slightly passed "home" position, toward a "purge" position.

In such a case, the carriage 32 is drawn downwardly from the position of FIG. 6, through the position represented by FIGS. 10 and 11, to the "purge" position shown in FIG. 12. In FIG. 10, the carriage is moving downwardly, as represented by the arrow 174. The stud 110 travels downwardly along the left edge of the cam lever 112, and then continues along the rounded bottom surface thereof. The stripper fingers 98 are in the stripping position, as shown in FIG. 10, and move in a counterclockwise direction, as indicated by arrow 176, as the stud 110 traverses the rounded bottom surface of the cam lever 112, so that the fingers 98 are in a currency clamping position when the carriage 32 reaches the "purge" position of FIG. 12.

As shown in FIG. 11, as the carriage 32 continues its downward movement from "home" position, the toothed portion 92 of the aligner plate 90 engages the gear segment 94, which causes said plate 90 to be rotated in a counterclockwise direction to an open position as the carriage 32 continues to move downwardly, as represented by the arrow 178, to the "purge" position of FIG. 12.

At this point, the solenoid 164 may be energized by the controller 168 to shift the purge drive assembly 122 in a clockwise direction as represented by the arrow 180 of FIG. 12, about the shaft 128, thus bringing the drive rollers 142 and 144 through the openings 84 and 86 in the plate 82, and driving the currency 91 out of the carriage 32, past the open aligner plate 90, and into the purge bin 146.

When the purge operation is completed, the solenoid 164 is deenergized by the controller 168 to shift the purge drive assembly counterclockwise out of operative relation with the carriage 32, and the motor 46 is actuated by the controller 168 to cause the tapes 28, 30 to bring the carriage 32 upward.

Figure 13:
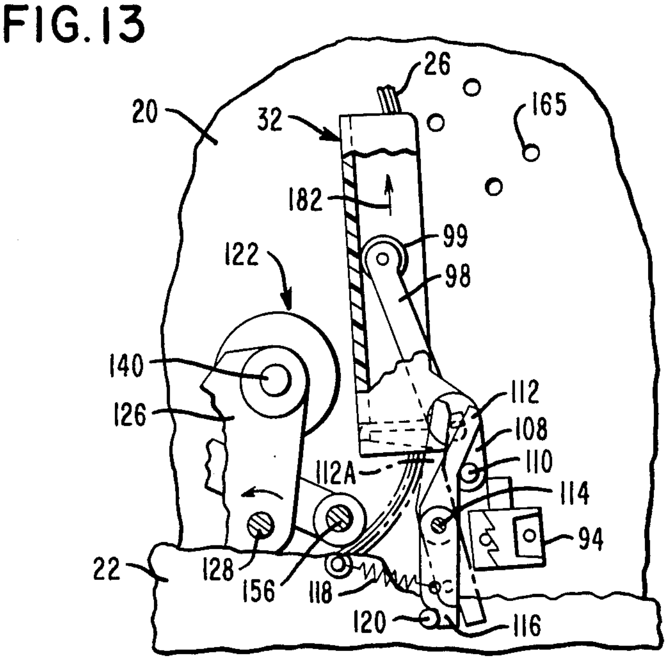
FIG. 13 is a view similar to FIGS. 6–10 inclusive, showing the carriage returning from "purge" position to "home" position.

In FIG. 13, the carriage 32 is shown during its upward movement, as represented by the arrow 182, from the "purge" position of FIG. 12, toward the "home" position of FIG. 6. It will be seen that the stud 110 has moved from left to right around the lower rounded surface of the cam lever 112 and has commenced movement up the right side surface of said cam lever. Such movement causes the cam lever 112 to rock against the urging of the spring 118 in a counterclockwise direction to the position 112A in which it is shown in phantom lines in FIG. 13. This movement continues until the carriage 32 has been moved upwardly to a position slightly above "home" position, in which the stud 110 is above the upper end of the cam lever 112 and the cam lever is moved by spring 118 in a clockwise direction to the solid-line position in which it is shown in FIG. 13. The carriage 32 is then moved slightly downwardly to the "home" position of FIG. 6 and the stud 110 once again engages the left side surface 113 of the cam lever 112. Another operation of loading currency into the carriage can then commence.

Figure 15:
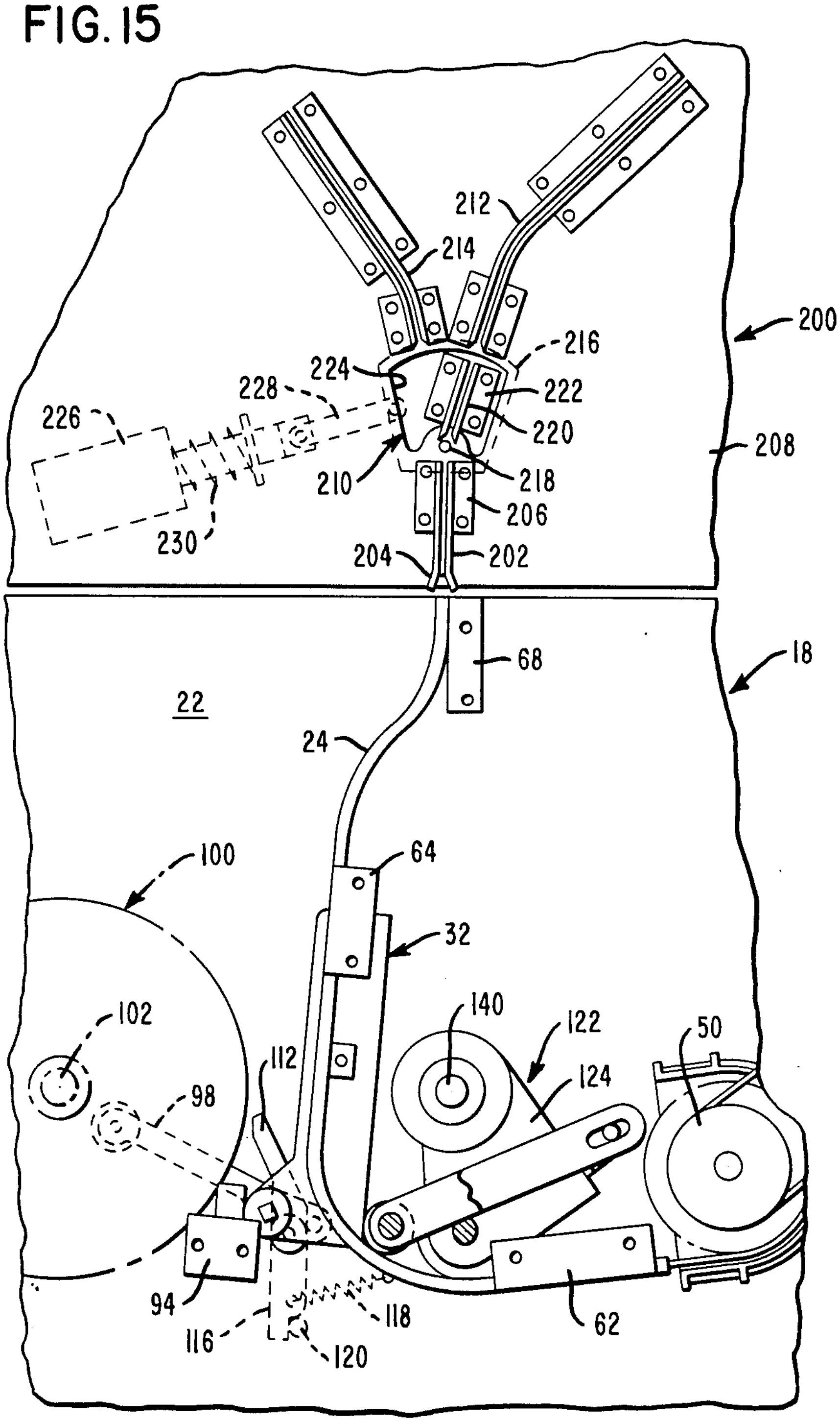
FIG. 15 is a fragmentary elevation view showing a first unit containing the flexible drive mechanism and a second unit coupled thereto which includes diverging multiple tracks and a switching mechanism for selecting which track is to be used by the drive mechanism.

Shown in FIG. 15 is an arrangement for extending the operation of the tapes 28, 30, and the carriage 32 attached thereto, from the unit 18 to a second unit 200 positioned in adjacent relationship thereto. The unit 200 carries a pair of tracks 202, each having a flared entrance 204 which is located in aligned relationship to the tracks 24 and 26 of the unit 18, and each secured to a frame 208 by a bracket 206. The tracks 202 can extend into or through the second unit 200, as desired. If desired, a further unit (not shown) could be positioned adjacent to the unit 200, and the tapes 28, 30, if of sufficient length, together with the carriage 32, could be driven thereto.

In the embodiment of FIG. 15, a multiple track arrangement is shown, in which the tracks 202 extend to a switching station 210, from which a pair of diverging sets of tracks 212 and 214 extend to predetermined locations in which appropriate disposition can be made of the currency carried by the carriage 32. A larger number of diverging sets of tracks could be provided, if desired.

Figure 14:
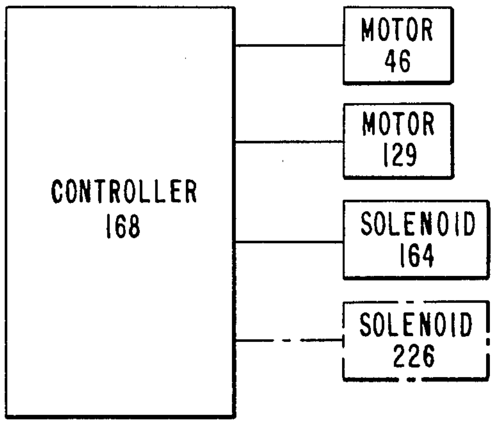
FIG. 14 is a schematic diagram showing the manner in which various elements of the system are controlled.

The switching station 210 includes a rockable base 216 mounted on a pivot 218 journaled in the frame 208. A short length of track 220 is secured to the base 216 by brackets 222 and extends through an aperture 224 in the frame 208. One end of the track 220 remains in alignment with the track 202 in all positions, while the other end of the track 220 is moved back and forth between two positions, in one of which it is aligned with the tracks 212, and in the other of which it is aligned with the tracks 214. Movement of the station 210 is accomplished by a solenoid 226 acting through an arm 228, and being normally urged to one of said two positions by a spring 230. Operation of the solenoid 226 is controlled by the controller 168, as shown in FIG. 14, or by suitable control circuitry of the automated teller machine or other device in which the feeding system of the illustrated embodiment is contained.

While the forms of the invention illustrated and described herein are particularly adapted to fulfill the objects aforesaid, it is to be understood that other and further modifications within the scope of the following claims may be made without departing from the spirit of the invention.

What is claimed is:

1. A drive system comprising, in combination:

frame means;

track means mounted on said frame means and including trunk means, a plurality of extended track means extending to a plurality of destinations, and switching means positioned between said trunk means and said extended track means, whereby said switching means may be operated to select a given one of said plurality of extended track means, to enable said utilizing means to be dispatched from said trunk means to a selected one of said plurality of destinations;

strip means adapted to be respectively movable in either of two directions along said track means, said strip means having first and second portions;

utilizing means coupled to said first portions of said strip means;

means coupled to said second portions of said strip means for selectively moving said strip means to move said utilizing means to any one of a plurality of different positions alongsaid track means; and at least one mechanism operator on said frame means engageable with said utilizing means in at least one of the plurality of different positions along said track means to cause the performance of at least one preselected operation by said utilizing means.

2. The drive system of claim 1, in which said switching means includes a rockable base having a section of track means secured thereto so that said base can be moved to position said section in alignment with a selected one of said plurality of extended track means, and with said trunk means.

3. The drive system of claim 2 in which said switching means includes a solenoid for moving said rockable base.

4. A drive system comprising in combination:

a pair of interconnected frames;

first and second tracks, each mounted on one of said frames in separated aligned relation to each other, said tracks including trunk tracks, a plurality of extended tracks extending to a plurality of destinations, and switching means positioned between said trunk tracks and said extended tracks, whereby said switching means may be operated to select a given one of said plurality of extended tracks, to enable said carriage to be dispatched from said trunk tracks to a selected one of said plurality of destinations;

first and second flexible strips, each partially disposed within one of said tracks and adapted to be movable in either of two directions along said tracks, each of said first and second strips having first and second portions;

a carriage coupled between said first portions of said first and second strips;

driving means coupled to said second portions of said first and second strips to move said carriage to any one of a plurality of positions along said tracks;

operating means on said carriage for causing a predetermined operation of said carriage;

means on one of said frames located at a predetermined position with respect to said tracks and capable of engaging said operating means as said carriage moves along said tracks to cause said predetermined operation of said carriage; and control means for controlling the operation of said driving means.

5. The drive system of claim 4, in which said switching means includes a rockable base having a section of track means secured thereto so that said base can be moved to position said section in alignment with a selected one of said plurality of extended tracks, and with said trunk tracks.

6. The drive system of claim 5 in which said switching means includes a switching solenoid for moving said rockable base.

7. The drive system of claim 6 in which said control means also controls the operation of said switching solenoid.

8. A drive system comprising, in combination:

frame means;

track means mounted on said frame means;

strip means adapted to be respectively movable in either of two directions along said track means, said strip means having first and second portions;

utilizing means coupled to said first portions of said strip means, including gripper means for gripping currency fed to said utilizing means, cam follower means for moving said gripper means into and out of currency gripping position as said utilizing means is moved along said track means, and retaining means for retaining said currency in position within said utilizing means;

means coupled to said second portions of said strip means for selectively moving said strip means to move said utilizing means to any one of a plurality of different positions along said track means;

a first mechanism operator on said frame means including cam means which is engageable with said cam follower means in said utilizing means in at least one of the plurality of different positions along said track means to cause said gripper means to move into and out of currency gripping position as said utilizing means is moved along said track means; and a second mechanism operator on said frame means operative to move said retaining means into and out of retaining position as said utilizing means is moved along said track means.

9. The drive system of claim 8 in which said utilizing means is selectively movable by said strip means from a home position in which currency is fed to said utilizing means to a first position in which currency is presented to a user of the system, or to a second position in which said retaining means is moved out of retaining position and said currency is purged from said utilizing means into a receptacle.

10. The drive system of claim 9, also including purge drive means which is capable of coacting with said utilizing means when said utilizing means is in said second position to drive said currency from said utilizing means past said moved retaining means and into said receptacle.

11. The drive system of claim 8 in which said retaining means includes a gear segment, and in which said second mechanism operator includes gear means mounted on said frame means, cooperating at times with said gear segment to cause said retaining means to open and close.

12. The drive system of claim 8 in which said track means comprises first and second aligned slotted tracks and in which said strip means comprises first and second flexible strips which move within the slots of said slotted tracks.

13. The drive system of claim 8, in which said means for moving said strip means comprises sprocket wheel means for driving said strip means.

14. The drive system of claim 13, also including spool means for containing first portions of said strip means at times.

15. The drive system of claim 14, also including guide means disposed adjacent to said spool means and said sprocket wheel means for guiding said strip means between said sprocket wheel means and said track means.

16. The drive system of claim 8, also including control means for controlling the operation of said means for selectively moving said strip means.

17. A drive system comprising, in combination:

a pair of interconnected frames;

first and second tracks, each mounted on one of said frames in separated aligned relation to each other;

first and second flexible strips, each partially disposed within one of said tracks and adapted to be movable in either of two directions along said tracks, each of said first and second strips having first and second portions;

a carriage coupled between said first portions of said first and second strips, and including gripper means for gripping currency which is fed to said carriage, said carriage also including retaining means for retaining said currency in position within said carriage;

driving means coupled to said second portions of said first and second strips to move said carriage to any one of a plurality of positions along said tracks;

operating means on said carriage including a cam follower for causing a predetermined operation of said carriage;

cam means on one of said frames located at a predetermined position with respect to said tracks and capable of engaging said cam follower to cause said gripper means to be moved into and out of currency gripping position as said carriage is moved along said tracks;

a second mechanism operator on one of said frames operative to move said retaining means into and out of retaining position as said carriage is moved along said tracks; and control means for controlling the operation of said driving means.

18. The drive system of claim 17 in which said carriage is selectively movable by said strips from a home position in which currency is fed to said carriage to a first position in which currency is presented to a user of the system, or to a second position in which said retaining means is moved out of retaining position and said currency is purged from said carriage into a receptacle.

19. The drive system of claim 18, also including purge drive means which is capable of coacting with said carriage when said carriage is in said second position to drive said currency from said carriage past said moved retaining means and into said receptacle.

20. The drive system of claim 17 in which said retaining means includes a gear segment, and in which said second mechanism operator includes gear means mounted on one of said frames, cooperating at times with said gear segment to cause said retaining means to open and close.

21. The drive system of claim 17, in which said driving means comprises a pair of sprocket wheels for driving said strips.

22. The drive system of claim 21, also including spool means for containing first portions of said strips at times.

23. The drive system of claim 22, also including guide means disposed adjacent to said spool means and said sprocket wheels for guiding said strips between said sprocket wheels and said tracks.

24. The drive system of claim 19 in which said control means also controls the operation of said purge drive means.

* * * * *